US012294167B2

(12) United States Patent
Li et al.

(10) Patent No.: US 12,294,167 B2
(45) Date of Patent: May 6, 2025

(54) CLOSED LOOP COMPRESSED CONNECTOR PIN

(71) Applicant: Intel Corporation, Santa Clara, CA (US)

(72) Inventors: Xiang Li, Portland, OR (US); Konika Ganguly, Portland, OR (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 17/375,558

(22) Filed: Jul. 14, 2021

(65) Prior Publication Data

US 2021/0344130 A1 Nov. 4, 2021

(51) Int. Cl.
*H01R 12/71* (2011.01)
*H01R 12/70* (2011.01)

(52) U.S. Cl.
CPC ....... *H01R 12/714* (2013.01); *H01R 12/7076* (2013.01)

(58) Field of Classification Search
CPC .......................... H01R 12/714; H01R 12/7076
USPC ............................................................ 439/66
See application file for complete search history.

(56) References Cited

U.S. PATENT DOCUMENTS 6,099,356 A 8/2000 Hwang
8,851,932 B2 * 10/2014 Mason ................ H01R 12/714 439/660
9,106,022 B2 * 8/2015 Cai .................... H01R 13/6471
10,003,150 B1 * 6/2018 Ju .......................... H01R 12/57
10,116,080 B1 * 10/2018 Ju ........................ H01R 12/714
10,148,024 B2 * 12/2018 Ju .......................... H01R 12/57
10,199,756 B2 * 2/2019 Ju ...................... H01R 13/2464
10,553,974 B2 * 2/2020 Li ...................... H01R 12/7005
10,784,204 B2 * 9/2020 Aygun .................... H01L 23/50
10,923,857 B2 * 2/2021 Wagner .............. H01R 13/2428
10,923,859 B2 * 2/2021 Lee ...................... H05K 5/0247
10,944,196 B2 * 3/2021 Ou ..................... H01R 13/2457
11,476,603 B2 10/2022 Buck et al.
2004/0077193 A1 4/2004 Peloza et al.
2011/0034045 A1 * 2/2011 Bilger .................. H01L 25/105 439/83
2014/0242839 A1 * 8/2014 Cai .................... H01R 13/6471 439/636
2019/0037695 A1 * 1/2019 Li ...................... H01R 12/7076
2019/0245309 A1 * 8/2019 Lee .................... H01R 12/7076
2019/0267732 A1 8/2019 Buck et al.
(Continued)

FOREIGN PATENT DOCUMENTS

CN 108847539 B * 11/2019 ......... H01R 12/7076
CN 112218425 A * 1/2021 ........... H01R 12/727

OTHER PUBLICATIONS

Dutch Examination Report for Patent Application No. 2032114, Mailed Jul. 4, 2023, 10 pages.

*Primary Examiner* — Peter G Leigh
(74) *Attorney, Agent, or Firm* — Compass IP Law PC

(57) ABSTRACT

A connector includes connector pins that have a loop of conductor. The connector connects a first printed circuit board (PCB) to a second PCB with compression of the connector pins between the two boards. In response to compression of the connector, the connector pins make electrical contact with themselves through the loop, while also connecting pads of the first PCB to pads of the second PCB.

14 Claims, 8 Drawing Sheets

500

(56) References Cited

U.S. PATENT DOCUMENTS

| | | | | |
|---|---|---|---|---|
| 2019/0334272 | A1* | 10/2019 | Hsu | H01R 12/714 |
| 2020/0117533 | A1* | 4/2020 | Nijhawan | G11C 5/04 |
| 2020/0220291 | A1* | 7/2020 | Ho | H01R 12/57 |
| 2021/0075140 | A1* | 3/2021 | Ho | H01R 13/2435 |
| 2021/0175654 | A1* | 6/2021 | Dai | H01R 13/2485 |
| 2021/0203097 | A1* | 7/2021 | Hsu | H01R 43/20 |
| 2021/0203098 | A1* | 7/2021 | Hsu | H01R 13/2407 |

* cited by examiner

CLOSED LOOP COMPRESSED CONNECTOR PIN

FIELD

Descriptions are generally related to interconnects, and more particular descriptions are related to connector pins.

BACKGROUND

System memory is typically included in a computer system by a module board (such as a dual inline memory module (DIMM)) that connects to a system board, such as a motherboard. SODIMM (small outline DIMM) boards are traditionally designed for connection by insertion of an edge of the SODIMM board into a connector. The connector traditionally has pins to make electrical connection with corresponding pads on the top and bottom of the SODIMM board. The connector pins are designed to have a similar physical length even though the contacts on the bottom of the board are much closer than the contacts on the top of the board. The length is equalized by introducing bends into the bottom connector pin.

The connector pins are relatively long metallic contacts to connect the SODIMM to the system board, and the memory signals must travel along the entire physical length without impedance control. Additionally, the return current path is also relatively long, making the connection very susceptible to noise. Noise is introduced from all around a signal pin.

The connector pins tend to introduce significant crosstalk between signals without good ground (GND) shielding between the pins of the SODIMM connector. The crosstalk introduces increasingly negative effects as the transfer frequencies increase, leading to poorer signaling and increased error rates. The noise can be reduced with the introduction of more ground pins, but such an approach would increase the pin count, requiring more PCB (printed circuit board) space and adding costs to the connectors and the boards.

BRIEF DESCRIPTION OF THE DRAWING

The following description includes discussion of figures having illustrations given by way of example of an implementation. The drawings should be understood by way of example, and not by way of limitation. As used herein, references to one or more examples are to be understood as describing a particular feature, structure, or characteristic included in at least one implementation of the invention. Phrases such as "in one example" or "in an alternative example" appearing herein provide examples of implementations of the invention, and do not necessarily all refer to the same implementation. However, they are also not necessarily mutually exclusive.

Descriptions of certain details and implementations follow, including non-limiting descriptions of the figures, which may depict some or all examples, and well as other potential implementations.

DETAILED DESCRIPTION

As described herein, a connector includes connector pins that have a loop of conductor. The connector connects a first printed circuit board (PCB) to a second PCB with compression of the connector pins between the two boards. When compressed between the two boards, the connector pins make electrical contact with themselves, while also connecting pads of the first PCB to pads of the second PCB. Making electrical contact with themselves ("self-contact") provides an additional current path in the connector pins, reducing the electrical length of the current paths.

A 'C-shaped' connector pin can be used to reduce the pin length in the connector, which improves the crosstalk. By also introducing self-contact into the connector pins, the self-contact will form a loop within the pin itself. The closed loop connector pin can then allow the signal to flow at the path closer to ground to form a shorter return path. When the signal pin electrical path is closer to the ground pin, the shorter return path improves crosstalk reduction.

The description of a closed loop connector pin can be introduced into any number of different system connectors. In one example, the closed connector is applied in a compressed footprint DIMM (dual inline memory module) for double data rate (DDR) memory connections. In one example, the closed connector is applied in a small outline DIMM (SODIMM) for a double data rate version 5 (DDR5) memory module. A model of the closed loop connector pin to a SODIMM module on a DDR channel has shown a reduction in crosstalk of approximately 5 dB.

Figure 1:
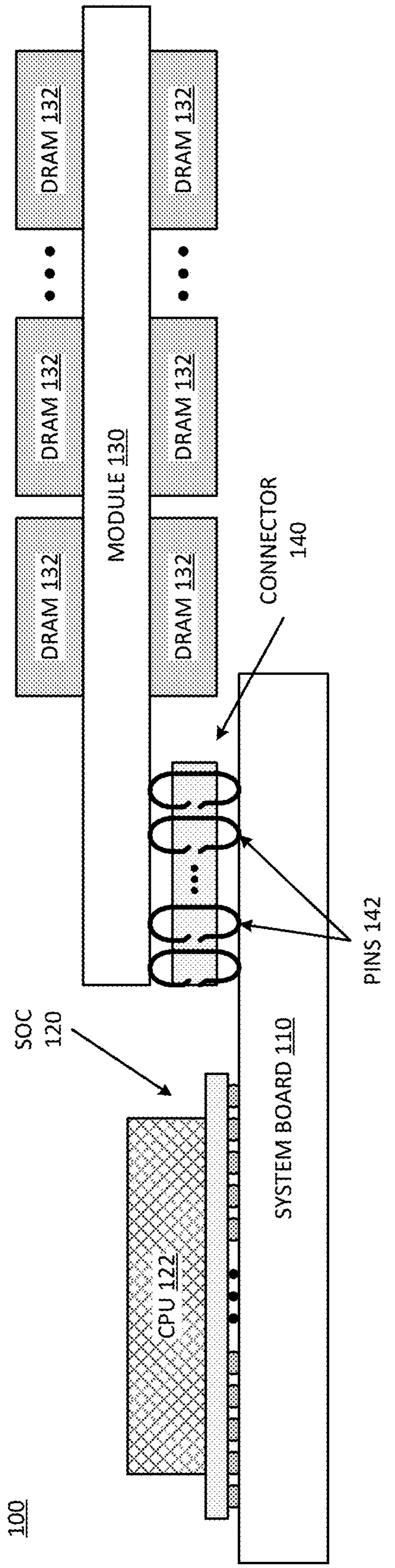
FIG. 1 is a block diagram of an example of a system in which a connector having a pin array with closed loop contacts.

FIG. 1 is a block diagram of an example of a system in which a connector having a pin array with closed loop contacts. System 100 includes module 130 to interconnect with system board 110. In one example, module 130 represents a memory module. In one example, module 130 is a SODIMM module. Module 130 provides memory for system board 110.

In one example, system board 110 represents a computer motherboard. System board includes SOC (system on a chip) 120, which can include CPU (central processor unit) 122 or other processor to execute system functions in system 100. SOC 120 can include other components not specifically illustrated, such as a memory controller (whether an integrated memory controller (iMC) or standalone component) to manage access to the memory of module 130. CPU 122 can execute a host operating system (OS) that controls the operation of system 100. The PCB (printed circuit board) of module 130 is a carrier of the memory devices of system 100, represented by DRAM (dynamic random access memory) devices 132. DRAM devices 132 can represent DRAM chips mounted on module 130.

In one example, the side of the module board 130 on which DRAM device 132 are mounted (which can be referred to as the top side or top surface) will have a connector or contact array to match the pin out or ball out of DRAM devices 132 to enable the DRAM devices to be mounted to module 130. The side of module board 130 that faces system board 110, opposite the side on which DRAM devices 132 are mounted (which can be referred to as a bottom side or bottom surface or system-board facing surface), includes an array of pads or contacts to enable connector 140 to electrically connect module 130 to system board 110. System board 110 likewise includes an array of pads or contacts corresponding to the connector pins of connector 140 to electrically connect to module 130.

Connector 140 electrically connects the PCB of module 130 with the PCB of system board 110. Connector 140 can be referred to as a board-to-board connector. Connector 140 includes a housing with connector pins mounted in the housing. Connector pins 142 are electrical conductors that make electrical contact between pads on system board 110 with corresponding pads on module 130.

Connector 140 includes pins 142 to provide electrical connection between module 130 and system board 110. In one example, connector 140 is a compression-style connector. A compression connector refers to a connector that has connector pins that have a spring mechanism that is held in tension when the connector is engaged. Typically, the connector is held in place with a screw that applies the compression and holds the connector pins in tension to engage physically and electrically with pads (not specifically shown) on the boards.

As illustrated, pins 142 are "open" in system 100. The configuration of system 100 suggests that compression has not been applied to connector 140. When compression is applied to connector 140, pins 142 will self-contact, creating a closed electrical loop in each connector pin. Each of pins 142 represents a conductor in a loop, where the pin self-contacts or makes electrical contact with itself through the loop. The loop can start closed or can close in response to compression of connector 140.

It will be understood that pins 142 connect a single signal line or ground line, as is traditionally done, but connecting to themselves, pins 142 provide shorter electrical pathways for signaling between system board 110 and module 130. As an alternative to pins 142 that start open and then close in response to compression of connector 140, connector 140 can include pins 142 that start closed and have a conductor that can move along itself to form a smaller closed loop in response to compression of connector 140.

The loop design of pins 142 is contrasted with the traditional butterfly configuration for SODIMM modules, where pins 142 have a much short interconnection length than traditional butterfly connectors, without the need for angles or bends in the connector pin. Pins 142 provide reduced impedance for signaling between SOC 120 and module 130 relative to traditional butterfly connectors.

Pins 142 are contrasted with proposed 'C' shaped connector pins. While C-shaped pins also enjoy a shorter physical length than butterfly pins, closing the connector electrically as with pins 142 provides improved noise reduction due to shorter electrical lengths to ground, providing better signal isolation. As described in more detail with respect to FIG. 5, pins 142 provide shorter loops for current.

Pins 142 are illustrated in a cutaway view in system 100. Connector 140 includes a housing, such a plastic material. In one example, the housing can include a material to hold pins 142 in position. In one example, the housing of connector 140 includes slots through the housing to permit pins 142 to contact the pads on the two boards to connect. Connector 140 includes pins 142 in a pinout map or pin layout that matches the pads on system board 110 and pads on module 130.

Pins 142 can extend through the housing of connector 140 to expose conductor through the top of the housing and to expose conductor through the bottom of the housing. The loop can thus be a loop of conductor extending out one side of connector 140, looping around through the conductor housing, and extending out the other side of the connector.

Figure 2A:
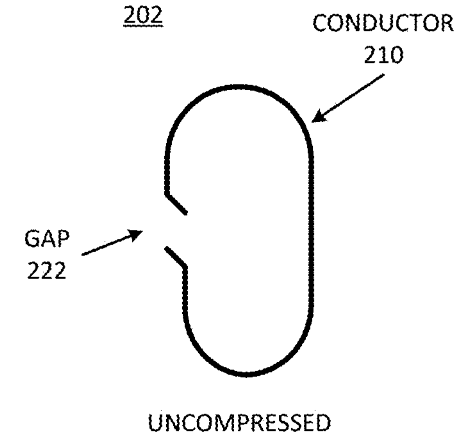
FIGS. 2A-2B illustrate an example of a closed loop connector pin that is open when uncompressed and closed when compressed.

FIG. 2A illustrates an example of a closed loop connector pin that is open when uncompressed. Pin state 202 has conductor 210 with gap 222. Gap 222 is an opening in conductor 210 in the uncompressed state of the pin.

Figure 2B:
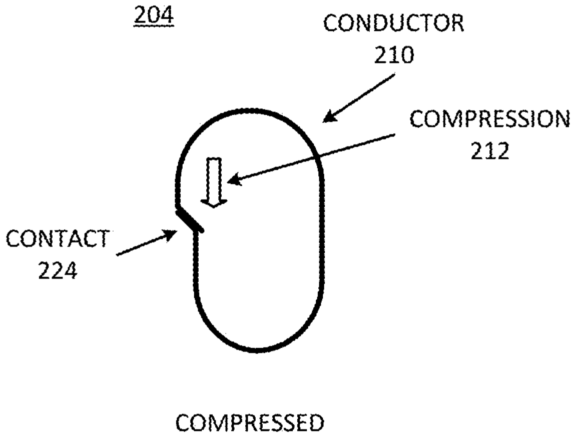

FIG. 2B illustrates an example of the closed loop connector pin of FIG. 2A, which changes from open to closed when compressed. The arrow in pin state 204 indicates compression 212, indicating the application of compression to the pin. In response to compression 212, conductor 210 closes together, making contact 224 where gap 222 was. Thus, in response to compression 212, the open loop of gap 222 becomes a closed loop. Conductor 210 has a starting shape of pin state 202, where conductor 210 is in pin state 202 at rest. Under compression the pin will be in pin state 204, closing the gap and causing conductor 210 to contact itself in a loop.

Figure 3A:
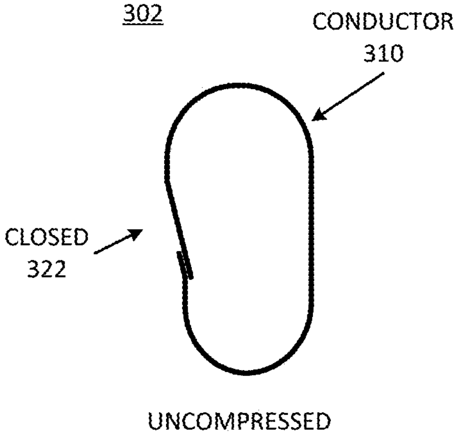
FIGS. 3A-3B illustrate an example of a closed loop connector pin that is closed when uncompressed and closed when compressed.

FIG. 3A illustrates an example of a closed loop connector pin that is closed when uncompressed. Pin state 302 has conductor 310 with closed portion 322. Closed portion 322 is a connection of conductor 310 with itself, but has a movable part that can move in response to compression of the pin. Pin state 302 represents the pin at rest, where conductor 310 is closed, with some overlap of the conductor at one portion of the loop of conductor 310.

Figure 3B:
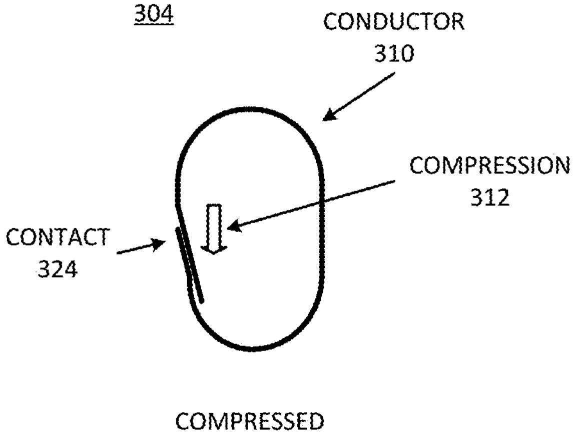

FIG. 3B illustrates an example of the closed loop connector pin of FIG. 3A, which remains closed as it compresses. The arrow in pin state 304 indicates compression 312, indicating the application of compression to the pin. In response to compression 312, the overlapped part of conductor 310 closes farther together. The conductor can be made to slide along itself at the portion of conductor 310 labeled contact 324. In response to compression 312, the space enclosed by the loop of the pin can be made smaller, thus going from a closed loop to a smaller loop in response to compression of the connector.

Figure 4:
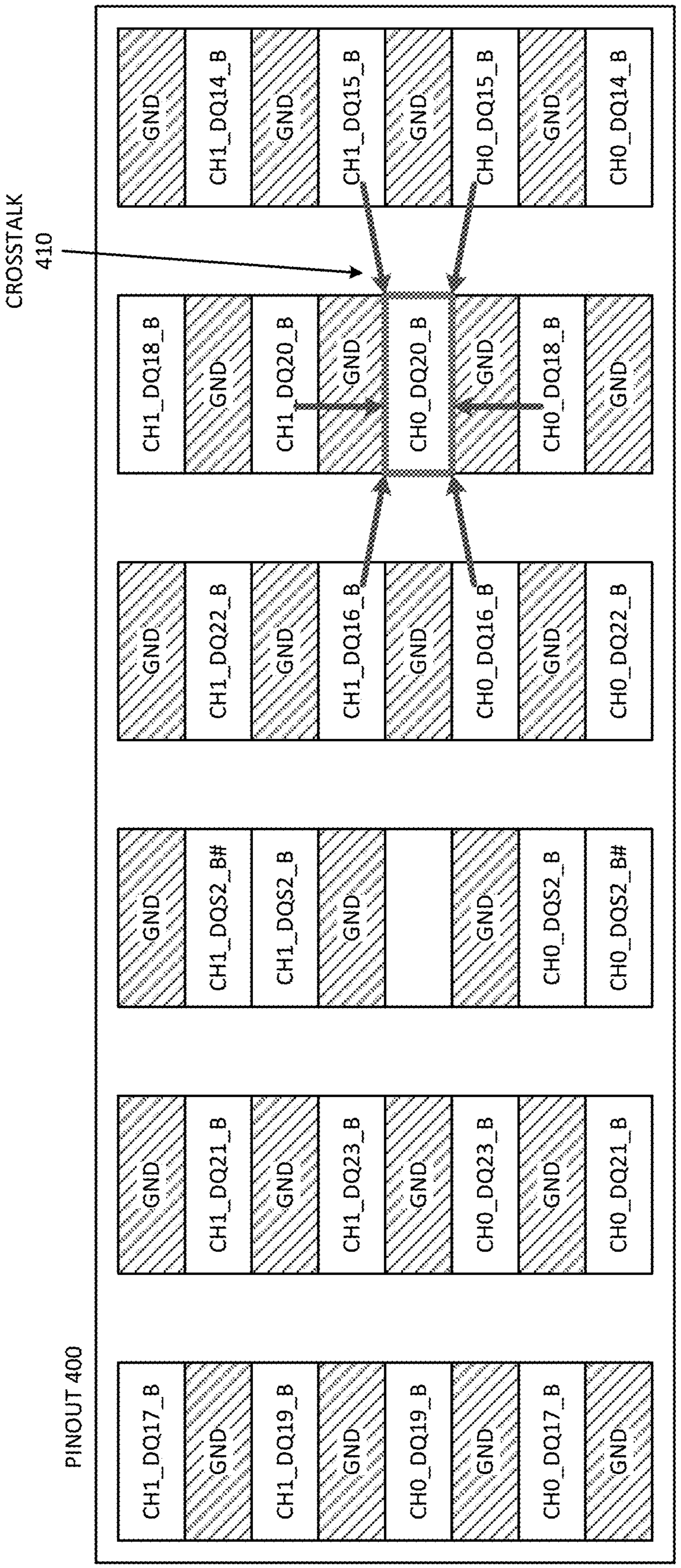
FIG. 4 is an example of a connector pin layout.

FIG. 4 is an example of a connector pin layout. Pinout 400 represents an example of a connector footprint for a DIMM design. In the footprint of connector pinout 400, the signal pins or DQ (data) pins have more aggressors than a traditional connector. Crosstalk from the multiple aggressors can limit signal quality, negatively impacting system memory access.

Pinout 400 does not show an entire connector array, but only a portion. The diagram illustrates alternating signal and ground pins. Starting from the left of the diagram, the signals illustrated include CH1_DQ17_B (Channel 1, DQ17), ground (GND), CH1_DQ19_B, GND, CH0_DQ19_B (Channel 0, DQ19), GND, CH0_DQ17_B, GND in one column. In an adjacent column are signals GND, CH1_DQ21_B, GND, CH1_DQ23_B, GND, CH0_DQ23_B, GND, CH0_DQ21_B. It will be observed that from left to right there is a ground pin to the left, right, top, and bottom of each signal pin.

The next column illustrates strobe signal pins, which are paired due to their differential nature. Thus, the column includes signals GND, CH1_DQS2_B # (Channel 1, data strobe 2, complement), CH1_DQS2_B (Channel 1, data strobe 2, primary signal), GND, unconnected, GND, CH1_DQS2_B (Channel 0, data strobe 2, primary signal), CH1_DQS2_B # (Channel 0, data strobe 2, complement).

Pinout 400 illustrates three adjacent columns next to the column with the data strobe signals, which include signals GND, CH1_DQ22_B, GND, CH1_DQ16_B, GND, CH0_DQ16_B, GND, CH0_DQ22_B, followed by CH1_DQ18_B, GND, CH1_DQ20_B, GND, CH0_DQ20_B, GND, CH0_DQ18_B, GND, followed by GND, CH1_DQ14_B, GND, CH1_DQ15_B, GND, CH0_DQ15_B, GND, CH0_DQ14_B. It will be understood that while specific signals are illustrated in a specific layout, the closed loop connectors described can be used with any pin layout.

Pinout 400 illustrates CH0_DQ20_B highlighted as one selected signal pad. The arrows pointing into the pad from neighboring signal pads represent crosstalk 410. The crosstalk is shown coming into the signal even across ground connection. Crosstalk 410 represents that there are many potential aggressors in certain connector pin arrays. Crosstalk 410 can be reduced with closed loop connector pins. The alternation of ground and signal pads can provide good shielding with the closed loop pins that make the signal path loops shorter by having shorter ground paths, reducing crosstalk 410.

Figure 5:
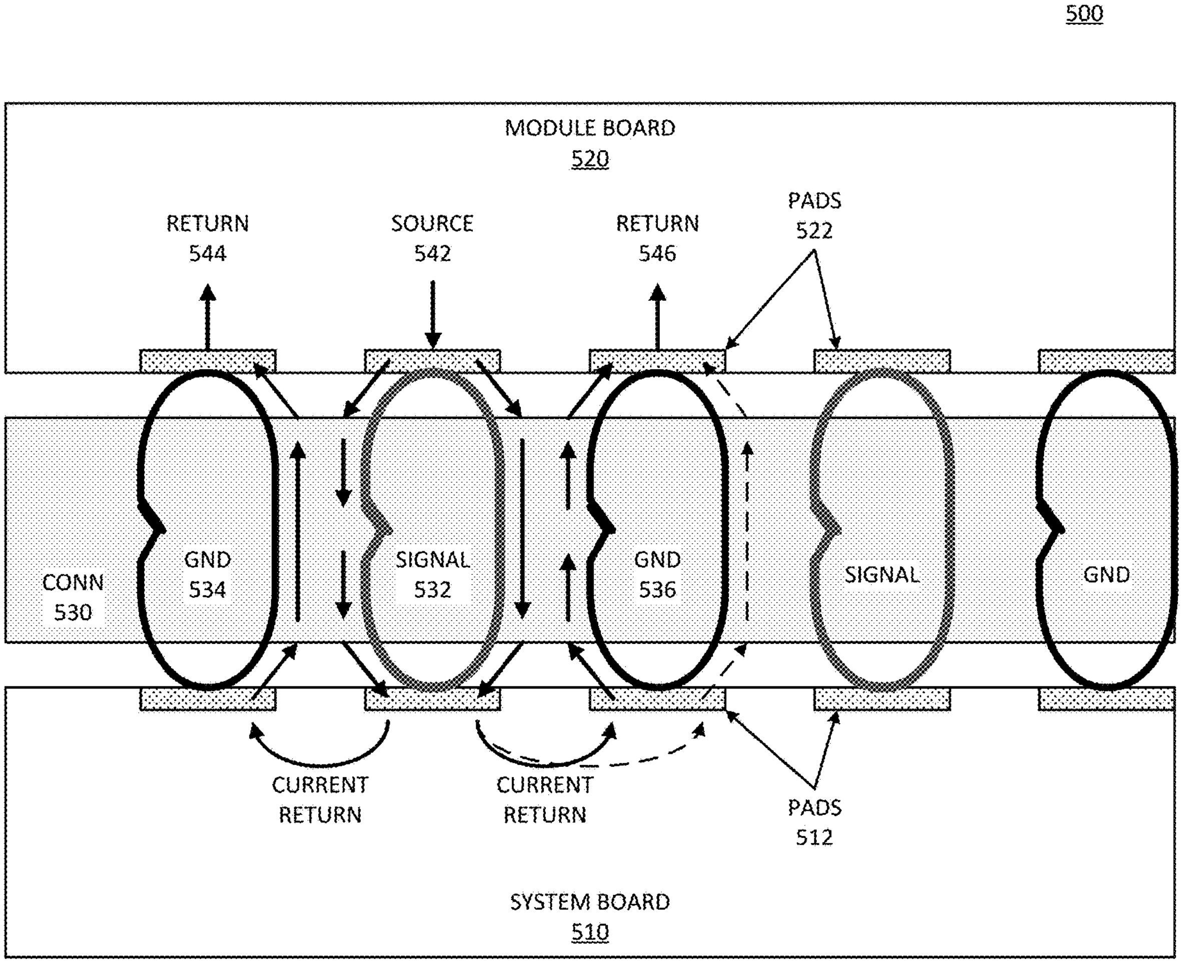
FIG. 5 is an example of current loops for a connector with closed loop connector pins.

FIG. 5 is an example of current loops for a connector with closed loop connector pins. System 500 represents a cross section view of a board to board connection. In one example, the two boards to interconnect in system 500 are system board 510 and module board 520. System board 510 can represent a primary board or motherboard. Module board 520 can represent a component or peripheral to add capability to the system. In one example, module board 520 represents a memory module.

System board 510 includes pads 512, which represent pads or contacts on the surface of the board to connect to traces or signal routing on the board. Module board 520 includes pads 522, which represent pads or contacts on the surface of the board to connect to traces or signal routing on the board. Connector (CONN) 530 interconnects pads 512 and pads 522.

System 500 represents connector 530 with alternating ground and signal pins, where the pins are represented as closed loop conductors. In system 500, the pins are illustrated as closed. The pins may be closed and then further close the loop in response to compression, or the pins may start open and then be closed in response to compression.

For illustration in system 500, signal pin 532 and the ground pins on either side of it, ground (GND) 534 and ground (GND) 536 show arrows representing the flow of current. Source 542 represents a signal source from module board 520, at pad 522 of signal pin 532. As illustrated, signal 532 is a closed loop pin. Thus, when the source signal source 542 is applied, current will flow to each side of the loop. Because current can flow down each side of the loop, it will be understood that the current return can pass into pin ground 534 and pin ground 536. The ground path for the side of the loop of signal 532 that is proximate ground 534 will pass up ground 534 as return 544. The ground path for the side of the loop of signal 532 that is proximate ground 536 will pass up ground 536 as return 546.

System 500 illustrates a traditional current return path in the dashed line. The dashed line will follow the sides of the loops that would make the contact in a traditional implementation. It can be observed in system 500 that the current return path of the dashed line is longer than the current return paths illustrated by the solid line arrows in system 500. The shorter current return path leads to reduced crosstalk with other signal pins, as the signal can more completely loop through the ground pins, reducing the amount of signal energy available to transmit into other signal pins.

Figure 6:
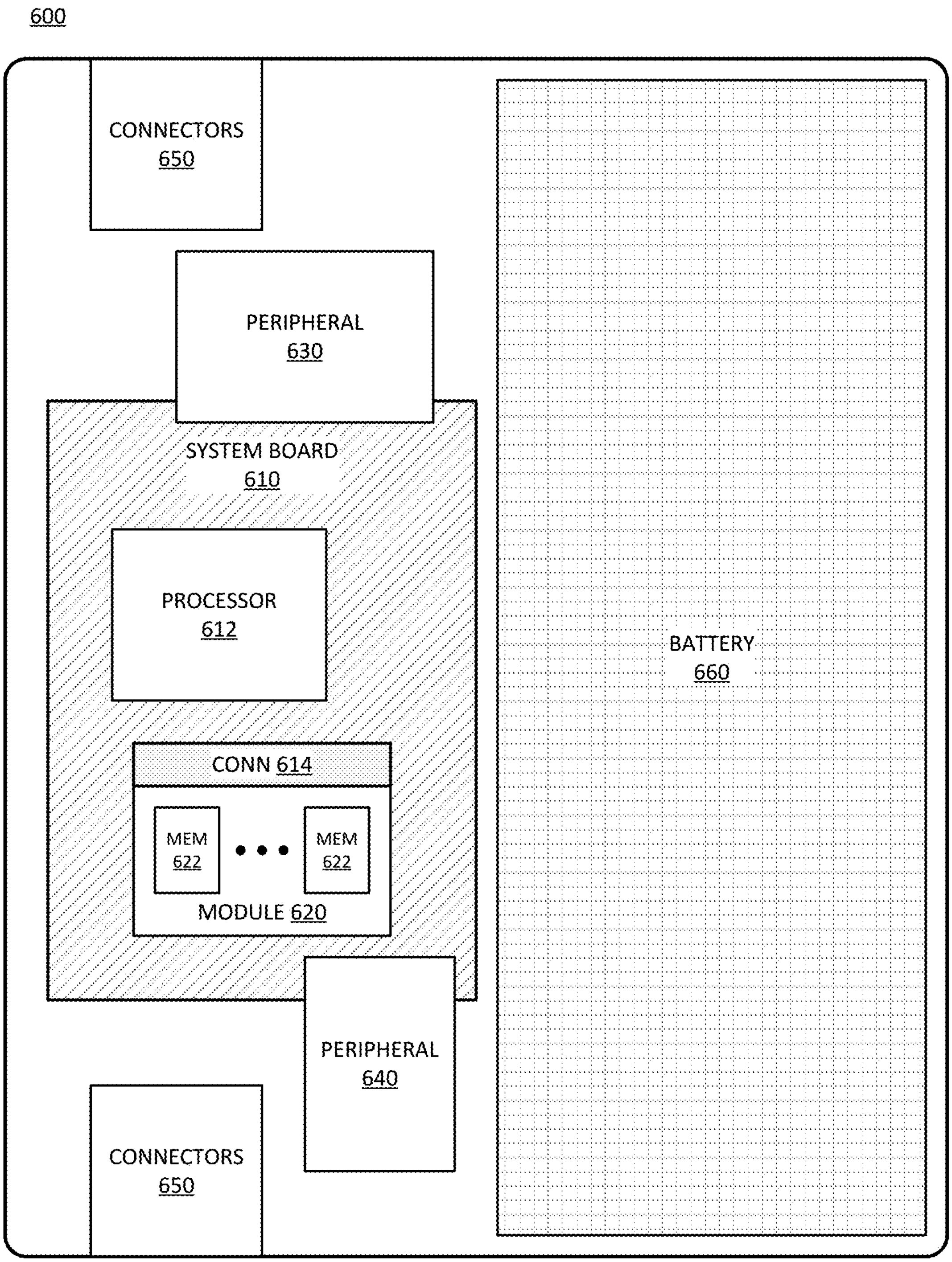
FIG. 6 is a block diagram of an example of a computer system with a connector having closed loop connector pins.

FIG. 6 is a block diagram of an example of a computer system with a connector having closed loop connector pins. System 600 represents a computing system or a computing device. For example, system 600 can be a laptop computer, a tablet computer, a smart phone or other handheld electronic device, or a two-in-one device. The display for the device is not explicitly shown in system 600, but can be a screen that covers device, or can be a display that connects via hinge, built on top of the chassis of system 600, or connect with some other connector (not shown).

In one example, system 600 has a clamshell design, where the processing elements and keyboard are fixed to the display element. In one example, system 600 is a detachable computer, where the processor and display are part of a common unit has a detachable keyboard.

System 600 includes system board 610, which represents a primary PCB to control the operation in system 600. System board 610 can be referred to as a motherboard in certain computer configurations. System board 610 represents a rectangular system board, which is a traditional system board configuration, with a length and a width (x and y axis, not specifically labeled for orientation in system 600).

System board 610 includes processor 612, which represents a host processor or main processing unit for system 600. In one example, processor 612 is a multicore processor. Processor 612 can be a central processing unit (CPU) or system on a chip (SOC) that includes a CPU or other processor. In one example, processor 612 can include a graphics processing unit (GPU), which can be the same as the primary processor, or separate from the primary processor.

System board 610 includes operational memory or system memory for the computing device. The operational memory generally is, or includes, volatile memory, which has indeterminate state if power is interrupted to the memory. In one example, system 600 includes memory provided by module 620. Module 620 illustrates a module that includes multiple memory devices or memory chips, represented by memory (MEM) 622. Module 620 can be a memory module in accordance with any example herein.

Module 620 interconnects with system board 610 via a connector array that has closed loop connector pins. Connector (CONN) 614 represents the connector with the closed loop pins. The closed loop pins can be in accordance with any description herein. Connector 614 connects module 620 to system board 610 through compression, such as securing module 620 to system board 610 and connector 614.

System 600 includes one or more peripherals connected to system board 610. Peripheral 630 ad peripheral 640 represent different peripherals that could be included in system 600. The size and number of the peripherals can be different in different system configurations. In one example, system 600 includes a solid state drive (SSD) as a peripheral device. In one example, system 600 includes a computation accelerator as a peripheral device. In one example, system 600 includes a wireless communication module or other network interface. A wireless communication module can be or include WiFi, Bluetooth (BT), WWAN (wireless wide area network) such as cellular, or other wireless communication.

System 600 includes connectors 650, which represent I/O (input/output) connectors to devices external to system 600. For example, connectors 650 can be or include USB (universal serial bus) connectors, video connectors such as HDMI (high definition media interface), company-proprietary connectors, or other I/O connectors.

System 600 includes battery 660 to power the system. In one example, system board 610 at least partially overlaps battery 660. It will be understood that the relative size, spacing, and location of components will be different depending on what type of system is implemented for system 600. The size and layout of system 600 is not necessarily intended to be typical or representative of each possible implementation, but illustrates possible components for such an implementation.

Figure 7:
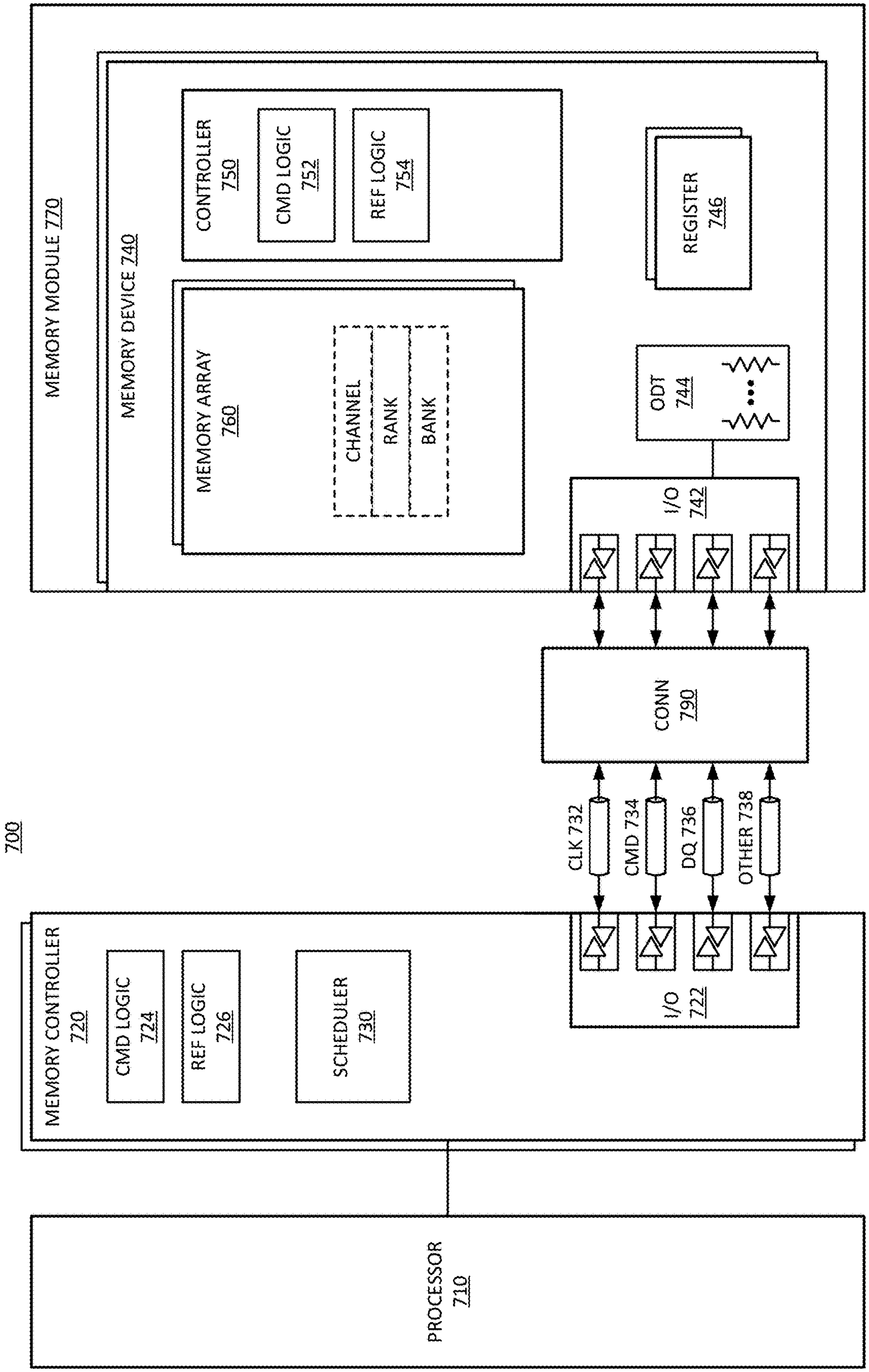
FIG. 7 is a block diagram of an example of a memory subsystem in which a connector having closed loop connector pins can be implemented.

FIG. 7 is a block diagram of an example of a memory subsystem in which a connector having closed loop connector pins can be implemented. System 700 includes a processor and elements of a memory subsystem in a computing device. System 700 is an example of a system in accordance with an example of system 100.

In one example, system 700 includes connector (CONN) 790 to interconnect memory module 770 and memory devices 740 of the memory module with memory controller 720. Memory controller 720 is disposed on a system board that includes pins, pads, or contacts to connect with memory device 740. Connector 790 represents a connector with closed loop pins in accordance with any example herein.

Processor 710 represents a processing unit of a computing platform that may execute an operating system (OS) and applications, which can collectively be referred to as the host or the user of the memory. The OS and applications execute operations that result in memory accesses. Processor 710 can include one or more separate processors. Each separate processor can include a single processing unit, a multicore processing unit, or a combination. The processing unit can be a primary processor such as a CPU (central processing unit), a peripheral processor such as a GPU (graphics processing unit), or a combination. Memory accesses may also be initiated by devices such as a network controller or hard disk controller. Such devices can be integrated with the processor in some systems or attached to the processer via a bus (e.g., PCI express), or a combination. System 700 can be implemented as an SOC (system on a chip), or be implemented with standalone components.

Reference to memory devices can apply to different memory types. Memory devices often refers to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random-access memory), or some variant such as synchronous DRAM (SDRAM). A memory subsystem as described herein may be compatible with a number of memory technologies, such as DDR4 (double data rate version 4, JESD79-4, originally published in September 2012 by JEDEC (Joint Electron Device Engineering Council, now the JEDEC Solid State Technology Association), LPDDR4 (low power DDR version 4, JESD209-4, originally published by JEDEC in August 2014), WIO2 (Wide I/O 2 (WideIO2), JESD229-2, originally published by JEDEC in August 2014), HBM (high bandwidth memory DRAM, JESD235A, originally published by JEDEC in November 2015), DDR5 (DDR version 5, originally published by JEDEC in July 2020), LPDDR5 (LPDDR version 5, JESD209-5, originally published by JEDEC in February 2019), HBM2 ((HBM version 2), currently in discussion by JEDEC), or others or combinations of memory technologies, and technologies based on derivatives or extensions of such specifications.

Memory controller 720 represents one or more memory controller circuits or devices for system 700. Memory controller 720 represents control logic that generates memory access commands in response to the execution of operations by processor 710. Memory controller 720 accesses one or more memory devices 740. Memory devices 740 can be DRAM devices in accordance with any referred to above. In one example, memory devices 740 are organized and managed as different channels, where each channel couples to buses and signal lines that couple to multiple memory devices in parallel. Each channel is independently operable. Thus, each channel is independently accessed and controlled, and the timing, data transfer, command and address exchanges, and other operations are separate for each channel. Coupling can refer to an electrical coupling, communicative coupling, physical coupling, or a combination of these. Physical coupling can include direct contact. Electrical coupling includes an interface or interconnection that allows electrical flow between components, or allows signaling between components, or both. Communicative coupling includes connections, including wired or wireless, that enable components to exchange data.

In one example, settings for each channel are controlled by separate mode registers or other register settings. In one example, each memory controller 720 manages a separate memory channel, although system 700 can be configured to have multiple channels managed by a single controller, or to have multiple controllers on a single channel. In one example, memory controller 720 is part of host processor 710, such as logic implemented on the same die or implemented in the same package space as the processor.

Memory controller 720 includes I/O interface logic 722 to couple to a memory bus, such as a memory channel as referred to above. I/O interface logic 722 (as well as I/O interface logic 742 of memory device 740) can include pins, pads, connectors, signal lines, traces, or wires, or other hardware to connect the devices, or a combination of these. I/O interface logic 722 can include a hardware interface. As illustrated, I/O interface logic 722 includes at least drivers/transceivers for signal lines. Commonly, wires within an integrated circuit interface couple with a pad, pin, or connector to interface signal lines or traces or other wires between devices. I/O interface logic 722 can include drivers, receivers, transceivers, or termination, or other circuitry or combinations of circuitry to exchange signals on the signal lines between the devices. The exchange of signals includes at least one of transmit or receive. While shown as coupling I/O 722 from memory controller 720 to I/O 742 of memory device 740, it will be understood that in an implementation of system 700 where groups of memory devices 740 are accessed in parallel, multiple memory devices can include I/O interfaces to the same interface of memory controller 720. In an implementation of system 700 including one or more memory modules 770, I/O 742 can include interface hardware of the memory module in addition to interface hardware on the memory device itself. Other memory controllers 720 will include separate interfaces to other memory devices 740.

The bus between memory controller 720 and memory devices 740 can be implemented as multiple signal lines coupling memory controller 720 to memory devices 740. The bus may typically include at least clock (CLK) 732, command/address (CMD) 734, and write data (DQ) and read data (DQ) 736, and zero or more other signal lines 738. In one example, a bus or connection between memory controller 720 and memory can be referred to as a memory bus. In one example, the memory bus is a multi-drop bus. The signal lines for CMD can be referred to as a "C/A bus" (or ADD/CMD bus, or some other designation indicating the transfer of commands (C or CMD) and address (A or ADD) information) and the signal lines for write and read DQ can be referred to as a "data bus." In one example, independent channels have different clock signals, C/A buses, data buses, and other signal lines. Thus, system 700 can be considered to have multiple "buses," in the sense that an independent interface path can be considered a separate bus. It will be understood that in addition to the lines explicitly shown, a bus can include at least one of strobe signaling lines, alert lines, auxiliary lines, or other signal lines, or a combination. It will also be understood that serial bus technologies can be used for the connection between memory controller 720 and memory devices 740. An example of a serial bus technology is 8B10B encoding and transmission of high-speed data with embedded clock over a single differential pair of signals in each direction. In one example, CMD 734 represents signal lines shared in parallel with multiple memory devices. In one example, multiple memory devices share encoding command signal lines of CMD 734, and each has a separate chip select (CS_n) signal line to select individual memory devices.

It will be understood that in the example of system 700, the bus between memory controller 720 and memory devices 740 includes a subsidiary command bus CMD 734 and a subsidiary bus to carry the write and read data, DQ 736. In one example, the data bus can include bidirectional lines for read data and for write/command data. In another example, the subsidiary bus DQ 736 can include unidirectional write signal lines for write and data from the host to memory, and can include unidirectional lines for read data from the memory to the host. In accordance with the chosen memory technology and system design, other signals 738 may accompany a bus or sub bus, such as strobe lines DQS. Based on design of system 700, or implementation if a design supports multiple implementations, the data bus can have more or less bandwidth per memory device 740. For example, the data bus can support memory devices that have either a ×4 interface, a ×8 interface, a ×16 interface, or other interface. The convention "×W," where W is an integer that refers to an interface size or width of the interface of memory device 740, which represents a number of signal lines to exchange data with memory controller 720. The interface size of the memory devices is a controlling factor on how many memory devices can be used concurrently per channel in system 700 or coupled in parallel to the same signal lines. In one example, high bandwidth memory devices, wide interface devices, or stacked memory configurations, or combinations, can enable wider interfaces, such as a ×128 interface, a ×256 interface, a ×512 interface, a ×1024 interface, or other data bus interface width.

In one example, memory devices 740 and memory controller 720 exchange data over the data bus in a burst, or a sequence of consecutive data transfers. The burst corresponds to a number of transfer cycles, which is related to a bus frequency. In one example, the transfer cycle can be a whole clock cycle for transfers occurring on a same clock or strobe signal edge (e.g., on the rising edge). In one example, every clock cycle, referring to a cycle of the system clock, is separated into multiple unit intervals (UIs), where each UI is a transfer cycle. For example, double data rate transfers trigger on both edges of the clock signal (e.g., rising and falling). A burst can last for a configured number of UIs, which can be a configuration stored in a register, or triggered on the fly. For example, a sequence of eight consecutive transfer periods can be considered a burst length eight (BL8), and each memory device 740 can transfer data on each UI. Thus, a ×8 memory device operating on BL8 can transfer 64 bits of data (8 data signal lines times 8 data bits transferred per line over the burst). It will be understood that this simple example is merely an illustration and is not limiting.

Memory devices 740 represent memory resources for system 700. In one example, each memory device 740 is a separate memory die. In one example, each memory device 740 can interface with multiple (e.g., 2) channels per device or die. Each memory device 740 includes I/O interface logic 742, which has a bandwidth determined by the implementation of the device (e.g., ×16 or ×8 or some other interface bandwidth). I/O interface logic 742 enables the memory devices to interface with memory controller 720. I/O interface logic 742 can include a hardware interface, and can be in accordance with I/O 722 of memory controller, but at the memory device end. In one example, multiple memory devices 740 are connected in parallel to the same command and data buses. In another example, multiple memory devices 740 are connected in parallel to the same command bus, and are connected to different data buses. For example, system 700 can be configured with multiple memory devices 740 coupled in parallel, with each memory device responding to a command, and accessing memory resources 760 internal to each. For a Write operation, an individual memory device 740 can write a portion of the overall data word, and for a Read operation, an individual memory device 740 can fetch a portion of the overall data word. The remaining bits of the word will be provided or received by other memory devices in parallel.

In one example, memory devices 740 are disposed directly on a motherboard or host system platform (e.g., a PCB (printed circuit board) on which processor 710 is disposed) of a computing device. In one example, memory devices 740 can be organized into memory modules 770. In one example, memory modules 770 represent dual inline memory modules (DIMMs). In one example, memory modules 770 represent other organization of multiple memory devices to share at least a portion of access or control circuitry, which can be a separate circuit, a separate device, or a separate board from the host system platform. Memory modules 770 can include multiple memory devices 740, and the memory modules can include support for multiple separate channels to the included memory devices disposed on them. In another example, memory devices 740 may be incorporated into the same package as memory controller 720, such as by techniques such as multi-chip-module (MCM), package-on-package, through-silicon via (TSV), or other techniques or combinations. Similarly, in one example, multiple memory devices 740 may be incorporated into memory modules 770, which themselves may be incorporated into the same package as memory controller 720. It will be appreciated that for these and other implementations, memory controller 720 may be part of host processor 710.

Memory devices 740 each include one or more memory arrays 760. Memory array 760 represents addressable memory locations or storage locations for data. Typically, memory array 760 is managed as rows of data, accessed via wordline (rows) and bitline (individual bits within a row) control. Memory array 760 can be organized as separate channels, ranks, and banks of memory. Channels may refer to independent control paths to storage locations within memory devices 740. Ranks may refer to common locations across multiple memory devices (e.g., same row addresses within different devices) in parallel. Banks may refer to sub-arrays of memory locations within a memory device 740. In one example, banks of memory are divided into sub-banks with at least a portion of shared circuitry (e.g., drivers, signal lines, control logic) for the sub-banks, allowing separate addressing and access. It will be understood that channels, ranks, banks, sub-banks, bank groups, or other organizations of the memory locations, and combinations of the organizations, can overlap in their application to physical resources. For example, the same physical memory locations can be accessed over a specific channel as a specific bank, which can also belong to a rank. Thus, the organization of memory resources will be understood in an inclusive, rather than exclusive, manner.

In one example, memory devices 740 include one or more registers 744. Register 744 represents one or more storage devices or storage locations that provide configuration or settings for the operation of the memory device. In one example, register 744 can provide a storage location for memory device 740 to store data for access by memory controller 720 as part of a control or management operation. In one example, register 744 includes one or more Mode Registers. In one example, register 744 includes one or more multipurpose registers. The configuration of locations within register 744 can configure memory device 740 to operate in different "modes," where command information can trigger different operations within memory device 740 based on the mode. Additionally or in the alternative, different modes can also trigger different operation from address information or other signal lines depending on the mode. Settings of register 744 can indicate configuration for I/O settings (e.g., timing, termination or ODT (on-die termination) 746, driver configuration, or other I/O settings).

In one example, memory device 740 includes ODT 746 as part of the interface hardware associated with I/O 742. ODT 746 can be configured as mentioned above, and provide settings for impedance to be applied to the interface to specified signal lines. In one example, ODT 746 is applied to DQ signal lines. In one example, ODT 746 is applied to command signal lines. In one example, ODT 746 is applied to address signal lines. In one example, ODT 746 can be applied to any combination of the preceding. The ODT settings can be changed based on whether a memory device is a selected target of an access operation or a non-target device. ODT 746 settings can affect the timing and reflections of signaling on the terminated lines. Careful control over ODT 746 can enable higher-speed operation with improved matching of applied impedance and loading. ODT 746 can be applied to specific signal lines of I/O interface 742, 722 (for example, ODT for DQ lines or ODT for CA lines), and is not necessarily applied to all signal lines.

Memory device 740 includes controller 750, which represents control logic within the memory device to control internal operations within the memory device. For example, controller 750 decodes commands sent by memory controller 720 and generates internal operations to execute or satisfy the commands. Controller 750 can be referred to as an internal controller, and is separate from memory controller 720 of the host. Controller 750 can determine what mode is selected based on register 744, and configure the internal execution of operations for access to memory resources 760 or other operations based on the selected mode. Controller 750 generates control signals to control the routing of bits within memory device 740 to provide a proper interface for the selected mode and direct a command to the proper memory locations or addresses. Controller 750 includes command logic 752, which can decode command encoding received on command and address signal lines. Thus, command logic 752 can be or include a command decoder. With command logic 752, memory device can identify commands and generate internal operations to execute requested commands.

Referring again to memory controller 720, memory controller 720 includes command (CMD) logic 724, which represents logic or circuitry to generate commands to send to memory devices 740. The generation of the commands can refer to the command prior to scheduling, or the preparation of queued commands ready to be sent. Generally, the signaling in memory subsystems includes address information within or accompanying the command to indicate or select one or more memory locations where the memory devices should execute the command. In response to scheduling of transactions for memory device 740, memory controller 720 can issue commands via I/O 722 to cause memory device 740 to execute the commands. In one example, controller 750 of memory device 740 receives and decodes command and address information received via I/O 742 from memory controller 720. Based on the received command and address information, controller 750 can control the timing of operations of the logic and circuitry within memory device 740 to execute the commands. Controller 750 is responsible for compliance with standards or specifications within memory device 740, such as timing and signaling requirements. Memory controller 720 can implement compliance with standards or specifications by access scheduling and control.

Memory controller 720 includes scheduler 730, which represents logic or circuitry to generate and order transactions to send to memory device 740. From one perspective, the primary function of memory controller 720 could be said to schedule memory access and other transactions to memory device 740. Such scheduling can include generating the transactions themselves to implement the requests for data by processor 710 and to maintain integrity of the data (e.g., such as with commands related to refresh). Transactions can include one or more commands, and result in the transfer of commands or data or both over one or multiple timing cycles such as clock cycles or unit intervals. Transactions can be for access such as read or write or related commands or a combination, and other transactions can include memory management commands for configuration, settings, data integrity, or other commands or a combination.

Memory controller 720 typically includes logic such as scheduler 730 to allow selection and ordering of transactions to improve performance of system 700. Thus, memory controller 720 can select which of the outstanding transactions should be sent to memory device 740 in which order, which is typically achieved with logic much more complex that a simple first-in first-out algorithm. Memory controller 720 manages the transmission of the transactions to memory device 740, and manages the timing associated with the transaction. In one example, transactions have deterministic timing, which can be managed by memory controller 720 and used in determining how to schedule the transactions with scheduler 730.

In one example, memory controller 720 includes refresh (REF) logic 726. Refresh logic 726 can be used for memory resources that are volatile and need to be refreshed to retain a deterministic state. In one example, refresh logic 726 indicates a location for refresh, and a type of refresh to perform. Refresh logic 726 can trigger self-refresh within memory device 740, or execute external refreshes which can be referred to as auto refresh commands) by sending refresh commands, or a combination. In one example, controller 750 within memory device 740 includes refresh logic 754 to apply refresh within memory device 740. In one example, refresh logic 754 generates internal operations to perform refresh in accordance with an external refresh received from memory controller 720. Refresh logic 754 can determine if a refresh is directed to memory device 740, and what memory resources 760 to refresh in response to the command.

Figure 8:
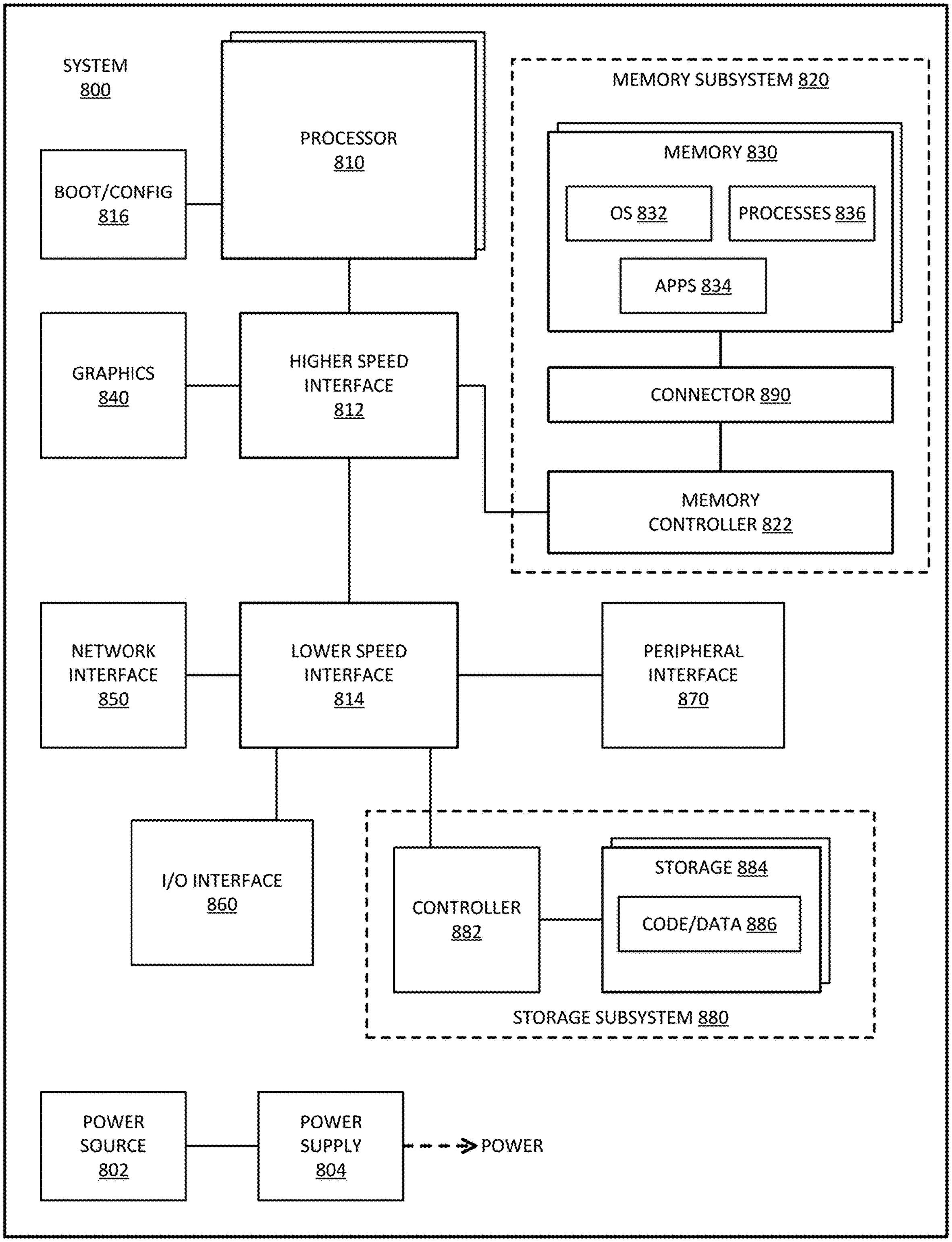
FIG. 8 is a block diagram of an example of a computing system in which a connector having closed loop connector pins can be implemented.

FIG. 8 is a block diagram of an example of a computing system in which a connector having closed loop connector pins can be implemented. System 800 represents a computing device in accordance with any example herein, and can be a laptop computer, a desktop computer, a tablet computer, a server, a gaming or entertainment control system, embedded computing device, or other electronic device. System 800 represents a computer system in accordance with an example of system 100.

In one example, system 800 includes connector 890 to interconnect memory 830 and memory controller 822. Memory controller 822 is disposed on a system board that includes pins, pads, or contacts to connect with memory 830. Connector 890 represents a connector with closed loop pins in accordance with any example herein.

System 800 includes processor 810 can include any type of microprocessor, central processing unit (CPU), graphics processing unit (GPU), processing core, or other processing hardware, or a combination, to provide processing or execution of instructions for system 800. Processor 810 can be a host processor device. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or a combination of such devices.

System 800 includes boot/config 816, which represents storage to store boot code (e.g., basic input/output system (BIOS)), configuration settings, security hardware (e.g., trusted platform module (TPM)), or other system level hardware that operates outside of a host OS. Boot/config 816 can include a nonvolatile storage device, such as read-only memory (ROM), flash memory, or other memory devices.

In one example, system 800 includes interface 812 coupled to processor 810, which can represent a higher speed interface or a high throughput interface for system components that need higher bandwidth connections, such as memory subsystem 820 or graphics interface components 840. Interface 812 represents an interface circuit, which can be a standalone component or integrated onto a processor die. Interface 812 can be integrated as a circuit onto the processor die or integrated as a component on a system on a chip. Where present, graphics interface 840 interfaces to graphics components for providing a visual display to a user of system 800. Graphics interface 840 can be a standalone component or integrated onto the processor die or system on a chip. In one example, graphics interface 840 can drive a high definition (HD) display or ultra high definition (UHD) display that provides an output to a user. In one example, the display can include a touchscreen display. In one example, graphics interface 840 generates a display based on data stored in memory 830 or based on operations executed by processor 810 or both.

Memory subsystem 820 represents the main memory of system 800, and provides storage for code to be executed by processor 810, or data values to be used in executing a routine. Memory subsystem 820 can include one or more varieties of random-access memory (RAM) such as DRAM, 3DXP (three-dimensional crosspoint), or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810, such as integrated onto the processor die or a system on a chip.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or other bus, or a combination.

In one example, system 800 includes interface 814, which can be coupled to interface 812. Interface 814 can be a lower speed interface than interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can exchange data with a remote device, which can include sending data stored in memory or receiving data to be stored in memory.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a non-volatile manner, such as one or more magnetic, solid state, NAND, 3DXP, or optical based disks, or a combination. Storage 884 holds code or instructions and data 886 in a persistent state (i.e., the value is retained despite interruption of power to system 800). Storage 884 can be generically considered to be a "memory," although memory 830 is typically the executing or operating memory to provide instructions to processor 810. Whereas storage 884 is non-volatile, memory 830 can include volatile memory (i.e., the value or state of the data is indeterminate if power is interrupted to system 800). In one example, storage subsystem 880 includes controller 882 to interface with storage 884. In one example controller 882 is a physical part of interface 814 or processor 810, or can include circuits or logic in both processor 810 and interface 814.

Power source 802 provides power to the components of system 800. More specifically, power source 802 typically interfaces to one or multiple power supplies 804 in system 800 to provide power to the components of system 800. In one example, power supply 804 includes an AC to DC (alternating current to direct current) adapter to plug into a wall outlet. Such AC power can be renewable energy (e.g., solar power) power source 802. In one example, power source 802 includes a DC power source, such as an external AC to DC converter. In one example, power source 802 or power supply 804 includes wireless charging hardware to charge via proximity to a charging field. In one example, power source 802 can include an internal battery or fuel cell source.

Figure 9:
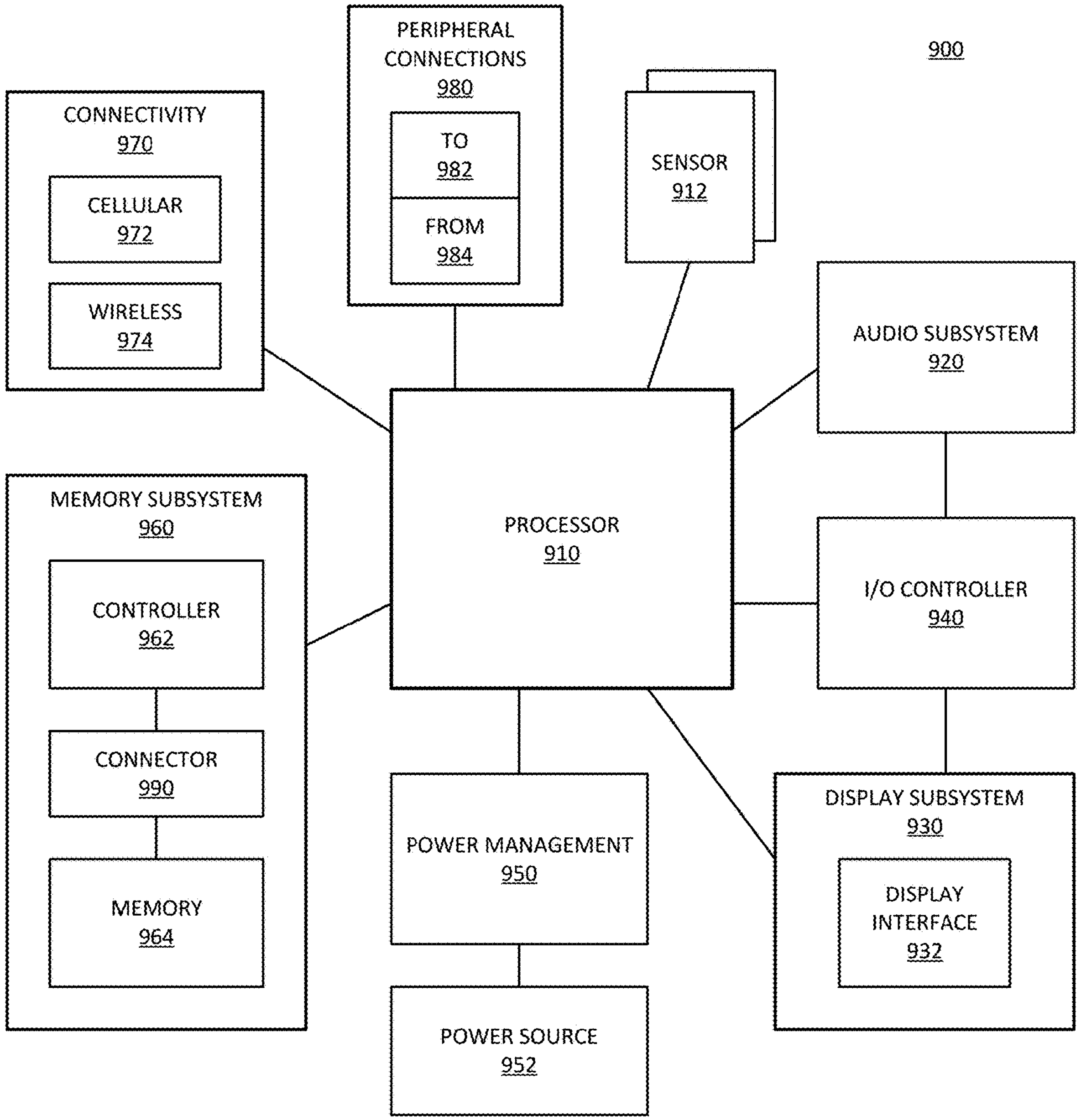
FIG. 9 is a block diagram of an example of a mobile device in which a connector having closed loop connector pins can be implemented.

FIG. 9 is a block diagram of an example of a mobile device in which a connector having closed loop connector pins can be implemented. System 900 represents a mobile computing device, such as a computing tablet, a mobile phone or smartphone, wearable computing device, or other mobile device, or an embedded computing device. It will be understood that certain of the components are shown generally, and not all components of such a device are shown in system 900. System 900 represents a computer system in accordance with an example of system 100.

In one example, system 900 includes connector 990 to interconnect memory 964 and memory controller 962. Memory controller 962 is disposed on a system board that includes pins, pads, or contacts to connect with memory 964. Connector 990 represents a connector with closed loop pins in accordance with any example herein.

System 900 includes processor 910, which performs the primary processing operations of system 900. Processor 910 can be a host processor device. Processor 910 can include one or more physical devices, such as microprocessors, application processors, microcontrollers, programmable logic devices, or other processing means. The processing operations performed by processor 910 include the execution of an operating platform or operating system on which applications and device functions are executed. The processing operations include operations related to I/O (input/output) with a human user or with other devices, operations related to power management, operations related to connecting system 900 to another device, or a combination. The processing operations can also include operations related to audio I/O, display I/O, or other interfacing, or a combination. Processor 910 can execute data stored in memory. Processor 910 can write or edit data stored in memory.

In one example, system 900 includes one or more sensors 912. Sensors 912 represent embedded sensors or interfaces to external sensors, or a combination. Sensors 912 enable system 900 to monitor or detect one or more conditions of an environment or a device in which system 900 is implemented. Sensors 912 can include environmental sensors (such as temperature sensors, motion detectors, light detectors, cameras, chemical sensors (e.g., carbon monoxide, carbon dioxide, or other chemical sensors)), pressure sensors, accelerometers, gyroscopes, medical or physiology sensors (e.g., biosensors, heart rate monitors, or other sensors to detect physiological attributes), or other sensors, or a combination. Sensors 912 can also include sensors for biometric systems such as fingerprint recognition systems, face detection or recognition systems, or other systems that detect or recognize user features. Sensors 912 should be understood broadly, and not limiting on the many different types of sensors that could be implemented with system 900. In one example, one or more sensors 912 couples to processor 910 via a frontend circuit integrated with processor 910. In one example, one or more sensors 912 couples to processor 910 via another component of system 900.

In one example, system 900 includes audio subsystem 920, which represents hardware (e.g., audio hardware and audio circuits) and software (e.g., drivers, codecs) components associated with providing audio functions to the computing device. Audio functions can include speaker or headphone output, as well as microphone input. Devices for such functions can be integrated into system 900, or connected to system 900. In one example, a user interacts with system 900 by providing audio commands that are received and processed by processor 910.

Display subsystem 930 represents hardware (e.g., display devices) and software components (e.g., drivers) that provide a visual display for presentation to a user. In one example, the display includes tactile components or touchscreen elements for a user to interact with the computing device. Display subsystem 930 includes display interface 932, which includes the particular screen or hardware device used to provide a display to a user. In one example, display interface 932 includes logic separate from processor 910 (such as a graphics processor) to perform at least some processing related to the display. In one example, display subsystem 930 includes a touchscreen device that provides both output and input to a user. In one example, display subsystem 930 includes a high definition (HD) or ultra-high definition (UHD) display that provides an output to a user. In one example, display subsystem includes or drives a touchscreen display. In one example, display subsystem 930 generates display information based on data stored in memory or based on operations executed by processor 910 or both.

I/O controller 940 represents hardware devices and software components related to interaction with a user. I/O controller 940 can operate to manage hardware that is part of audio subsystem 920, or display subsystem 930, or both. Additionally, I/O controller 940 illustrates a connection point for additional devices that connect to system 900 through which a user might interact with the system. For example, devices that can be attached to system 900 might include microphone devices, speaker or stereo systems, video systems or other display device, keyboard or keypad devices, buttons/switches, or other I/O devices for use with specific applications such as card readers or other devices.

As mentioned above, I/O controller 940 can interact with audio subsystem 920 or display subsystem 930 or both. For example, input through a microphone or other audio device can provide input or commands for one or more applications or functions of system 900. Additionally, audio output can be provided instead of or in addition to display output. In another example, if display subsystem includes a touchscreen, the display device also acts as an input device, which can be at least partially managed by I/O controller 940. There can also be additional buttons or switches on system 900 to provide I/O functions managed by I/O controller 940.

In one example, I/O controller 940 manages devices such as accelerometers, cameras, light sensors or other environmental sensors, gyroscopes, global positioning system (GPS), or other hardware that can be included in system 900, or sensors 912. The input can be part of direct user interaction, as well as providing environmental input to the system to influence its operations (such as filtering for noise, adjusting displays for brightness detection, applying a flash for a camera, or other features).

In one example, system 900 includes power management 950 that manages battery power usage, charging of the battery, and features related to power saving operation. Power management 950 manages power from power source 952, which provides power to the components of system 900. In one example, power source 952 includes an AC to DC (alternating current to direct current) adapter to plug into a wall outlet. Such AC power can be renewable energy (e.g., solar power, motion based power). In one example, power source 952 includes only DC power, which can be provided by a DC power source, such as an external AC to DC converter. In one example, power source 952 includes wireless charging hardware to charge via proximity to a charging field. In one example, power source 952 can include an internal battery or fuel cell source.

Memory subsystem 960 includes memory device(s) 962 for storing information in system 900. Memory subsystem 960 can include nonvolatile (state does not change if power to the memory device is interrupted) or volatile (state is indeterminate if power to the memory device is interrupted) memory devices, or a combination. Memory 960 can store application data, user data, music, photos, documents, or other data, as well as system data (whether long-term or temporary) related to the execution of the applications and functions of system 900. In one example, memory subsystem 960 includes memory controller 964 (which could also be considered part of the control of system 900, and could potentially be considered part of processor 910). Memory controller 964 includes a scheduler to generate and issue commands to control access to memory device 962.

Connectivity 970 includes hardware devices (e.g., wireless or wired connectors and communication hardware, or a combination of wired and wireless hardware) and software components (e.g., drivers, protocol stacks) to enable system 900 to communicate with external devices. The external device could be separate devices, such as other computing devices, wireless access points or base stations, as well as peripherals such as headsets, printers, or other devices. In one example, system 900 exchanges data with an external device for storage in memory or for display on a display device. The exchanged data can include data to be stored in memory, or data already stored in memory, to read, write, or edit data.

Connectivity 970 can include multiple different types of connectivity. To generalize, system 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), 5G, or other cellular service standards. Wireless connectivity 974 refers to wireless connectivity that is not cellular, and can include personal area networks (such as Bluetooth), local area networks (such as WiFi), or wide area networks (such as WiMax), or other wireless communication, or a combination. Wireless communication refers to transfer of data through the use of modulated electromagnetic radiation through a non-solid medium. Wired communication occurs through a solid communication medium.

Peripheral connections 980 include hardware interfaces and connectors, as well as software components (e.g., drivers, protocol stacks) to make peripheral connections. It will be understood that system 900 could both be a peripheral device ("to" 982) to other computing devices, as well as have peripheral devices ("from" 984) connected to it. System 900 commonly has a "docking" connector to connect to other computing devices for purposes such as managing (e.g., downloading, uploading, changing, synchronizing) content on system 900. Additionally, a docking connector can allow system 900 to connect to certain peripherals that allow system 900 to control content output, for example, to audiovisual or other systems.

In addition to a proprietary docking connector or other proprietary connection hardware, system 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), or other type.

In general with respect to the descriptions herein, in one example a connector includes: a housing; and connector pins to connect contacts of a first printed circuit board (PCB) to a second PCB, wherein a connector pin has a conductor in a loop, wherein in response to compression of the connector, the pin is to make electrical contact with itself through the loop.

In one example of the connector, when uncompressed, the loop comprises an open loop, which is to become a closed loop in response to the compression of the connector. In one example of the connector, when uncompressed, the loop comprises a closed loop, wherein the conductor is to slide along itself to make a smaller closed loop in response to the compression of the connector. In accordance with any preceding example of the connector, in one example, wherein the connector pins pass through the housing, with a top of the loop extending through a top of the housing and a bottom of the loop extending through a bottom of the housing. In accordance with any preceding example of the connector, in one example, the connector pins have a connector pinout with alternating ground and signal pins. In accordance with any preceding example of the connector, in one example, the first PCB comprises a system board and the second PCB comprises a memory module. In accordance with any preceding example of the connector, in one example, the second PCB comprises a small outline dual inline memory module (SODIMM). In accordance with any preceding example of the connector, in one example, the memory module includes multiple dynamic random access memory (DRAM) devices. In accordance with any preceding example of the connector, in one example, the DRAM devices comprise DRAM device compatible with a double data rate version 5 (DDR5) standard.

In general with respect to the descriptions herein, in one example a computer system includes: a system board including a processor; a memory module including multiple memory devices; a connector to interconnect the system board to the memory module, the connector including: a housing; and connector pins to connect contacts of the system board to the memory module, wherein a connector pin has a conductor in a loop, wherein in response to compression of the connector, the pin is to make electrical contact with itself through the loop.

In one example of the computer system, when uncompressed, the loop comprises an open loop, which is to become a closed loop in response to the compression of the connector. In one example of the computer system, when uncompressed, the loop comprises a closed loop, wherein the conductor is to slide along itself to make a smaller closed loop in response to the compression of the connector. In accordance with any preceding example of the computer system, in one example, the connector pins pass through the housing, with a top of the loop extending through a top of the housing and a bottom of the loop extending through a bottom of the housing. In accordance with any preceding example of the computer system, in one example, the connector pins have a connector pinout with alternating ground and signal pins. In accordance with any preceding example of the computer system, in one example, the memory module comprises a small outline dual inline memory module (SODIMM). In accordance with any preceding example of the computer system, in one example, the memory module includes multiple dynamic random access memory (DRAM) devices. In accordance with any preceding example of the computer system, in one example, the DRAM devices comprise DRAM device compatible with a double data rate version 5 (DDR5) standard. In accordance with any preceding example of the computer system, in one example, one or more of: the processor comprises a multi-core processor; the system further includes a display communicatively coupled to a host processor of the system board; the system further includes a network interface communicatively coupled to a host processor of the system board; or the system further includes a battery to power the computer system.

Flow diagrams as illustrated herein provide examples of sequences of various process actions. The flow diagrams can indicate operations to be executed by a software or firmware routine, as well as physical operations. A flow diagram can illustrate an example of the implementation of states of a finite state machine (FSM), which can be implemented in hardware and/or software. Although shown in a particular sequence or order, unless otherwise specified, the order of the actions can be modified. Thus, the illustrated diagrams should be understood only as examples, and the process can be performed in a different order, and some actions can be performed in parallel. Additionally, one or more actions can be omitted; thus, not all implementations will perform all actions.

To the extent various operations or functions are described herein, they can be described or defined as software code, instructions, configuration, and/or data. The content can be directly executable ("object" or "executable" form), source code, or difference code ("delta" or "patch" code). The software content of what is described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to what is disclosed and implementations of the invention without departing from their scope. Therefore, the illustrations and examples herein should be construed in an illustrative, and not a restrictive sense. The scope of the invention should be measured solely by reference to the claims that follow.

What is claimed is:

1. A board-to-board connector, comprising:

a housing; and connector pins to connect contacts of a first printed circuit board (PCB) to a second PCB, wherein a connector pin has a first conductor portion and a second conductor portion that form a loop, wherein, when uncompressed, the loop comprises a closed loop, wherein in response to compression of the connector, the first conductor portion is to make electrical contact with the second conductor portion, wherein the first conductor portion is to slide vertically along the second conductor portion to make a smaller closed loop in response to the compression of the connector.

2. The connector of claim 1, wherein the connector pins pass through the housing, with a top of the loop extending through a top of the housing and a bottom of the loop extending through a bottom of the housing.

3. The connector of claim 1, wherein the connector pins have a connector pinout with alternating ground and signal pins.

4. The connector of claim 1, wherein the first PCB comprises a system board and the second PCB comprises a memory module.

5. The connector of claim 4, wherein the second PCB comprises a small outline dual inline memory module (SODIMM).

6. The connector of claim 4, wherein the memory module includes multiple dynamic random access memory (DRAM) devices.

7. The connector of claim 6, wherein the DRAM devices comprise DRAM device compatible with a double data rate version 5 (DDR5) standard.

8. A computer system comprising:

a system board including a processor;

a memory module including multiple memory devices;

a connector to interconnect the system board to the memory module, the connector including:

a housing; and connector pins to connect contacts of the system board to the memory module, wherein a connector pin has a first conductor portion and a second conductor portion that form a loop, wherein, when uncompressed, the loop comprises a closed loop, wherein in response to compression of the connector, the first conductor portion is to make electrical contact with the second conductor portion, wherein the first conductor portion is to slide vertically along the second conductor portion to make a smaller closed loop in response to the compression of the connector.

9. The computer system of claim 8, wherein the connector pins pass through the housing, with a top of the loop extending through a top of the housing and a bottom of the loop extending through a bottom of the housing.

10. The computer system of claim 8, wherein the connector pins have a connector pinout with alternating ground and signal pins.

11. The computer system of claim 8, wherein the memory module comprises a small outline dual inline memory module (SODIMM).

12. The computer system of claim 11, wherein the memory module includes multiple dynamic random access memory (DRAM) devices.

13. The computer system of claim 12, wherein the DRAM devices comprise DRAM device compatible with a double data rate version 5 (DDR5) standard.

14. The computer system of claim 8, wherein one or more of:

the processor comprises a multicore processor;

the system further includes a display communicatively coupled to a host processor of the system board;

the system further includes a network interface communicatively coupled to a host processor of the system board; or the system further includes a battery to power the computer system.

* * * * *